June 23, 1942.  H. W. HAPMAN  2,287,378
FLIGHT CONVEYER
Filed Feb. 1, 1940
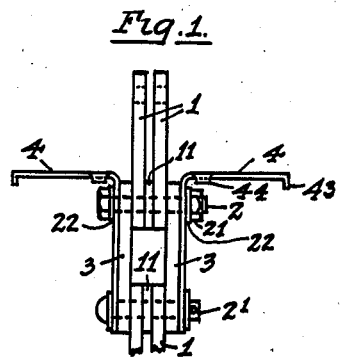
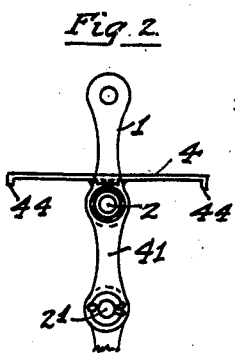
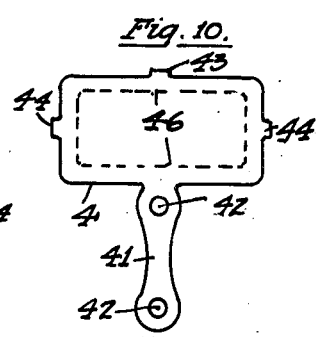
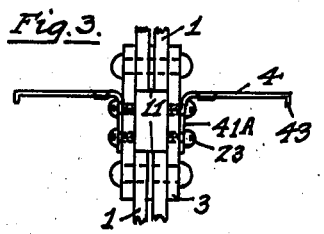
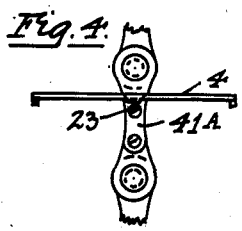
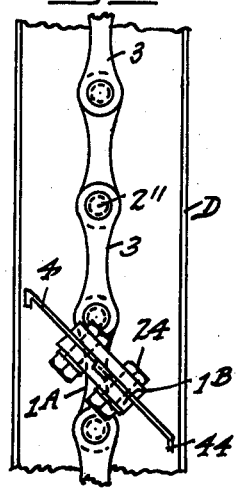
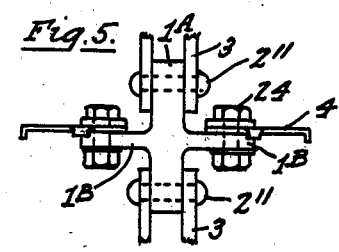
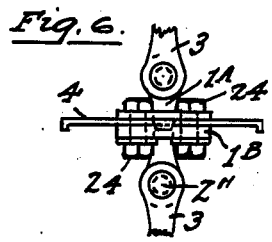
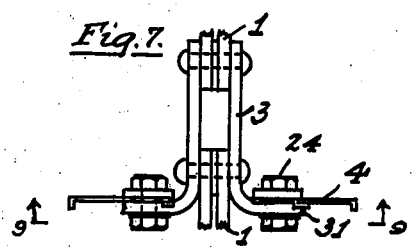
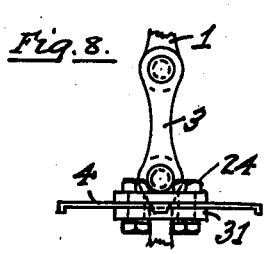
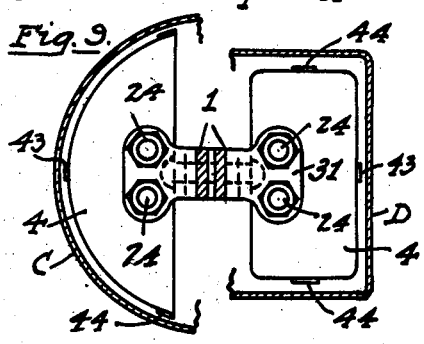
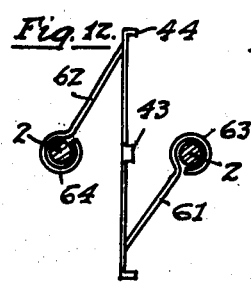
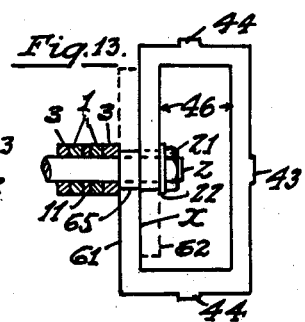
Inventor -
Henry W. Hapman Patented June 23, 1942

2,287,378

UNITED STATES PATENT OFFICE 2,287,378

FLIGHT CONVEYER

Henry W. Hapman, Detroit, Mich.

Application February 1, 1940, Serial No. 316,706

2 Claims. (Cl. 198—171)

This invention relates to conveyers of the type in which a propelling chain is provided with a series of flights by which material within the casing is moved in horizontal, vertical, angular, or other direction as desired. In this type of conveyer, as at present constructed, the flights are usually of cast metal either attached to or formed integral with the chain links. As a consequence, the flights are very rigidly held so that when they come in contact with foreign bodies or other obstructions, breakage of the flight or of the chain results, thus holding up production and increasing maintenance costs. This construction, moreover, has the objection that, due to the weight of the parts and the relatively soft material employed therein, frequent renewals and repairs are necessary.

The principal object of the present invention is to provide a flight which may be stamped out from high carbon alloy steel or from tempered spring steel of commercial flat or plate form which may be so shaped as to suit any desired shape of conduit or casing and which is provided with integral lugs or other portions which are adapted to be easily secured to the various types of commercial conveyer chains. By this construction a resiliency is obtained which will enable the flights to deflect in passing over minor obstructions and to return to their original shape without damage. Further, their light weight and smooth surface, as well as their relative hardness as compared to that of the casing, will result in much longer life of the flights and reduced operating horsepower.

Another object of my said invention is to provide projecting feet or lugs upon the marginal edges of the flights so that the pressure between the flights and the casing is distributed over the necessary amount of wearing surface. It will be understood that where the casing is filled with material, the flight itself practically floats in the same, and that the feet or lugs come into more effective action when the chain is traveling through empty portions of the casing on horizontal runs.

With these and other objects in view, I will now describe several embodiments of my invention, as well as various methods of attaching the flights to the chain elements, reference being had to the accompanying drawing, in which—

Figure 1 is a fragmentary elevational view showing one method of attaching my improved flights to the propelling chain.

Figure 2 is a side elevation of the same.

Figure 3 is a fragmentary elevational view showing another method of attaching the flights.

Figure 4 is a side elevation of the same.

Figure 5 is a fragmentary elevational view showing a method of attaching the flights in which a special form of chain link is employed.

Figure 6 is a side elevation of the same.

Figure 7 is a fragmentary elevational view showing special forms of link having bent up portions to which the flight is attached.

Figure 8 is a side elevation of the same.

Figure 9 is an underside view of the same looking in the direction of line 9—9 in Figure 7.

Figure 10 shows one of the blanks from which my improved flight is formed.

Figure 11 is a fragmentary side view illustrating the use of the special link shown in Figures 5 and 6 but so designed as to carry the flights in an angular position relative to the center line of the chain.

Figure 12 is a side elevation showing a special form of flight which is easily attached to the chain, and Figure 13 is a fragmentary elevational view showing the same together with its connection to the transverse pins of the chain.

Like characters designate corresponding parts throughout the several views.

Referring more especially to Figures 1 and 2 of the drawing, the numeral 1 designates the inner links of the chain having therebetween washers 11 surrounding the transverse pins 2 and 2' of the chain, while the numerals 3 designate the outer links of the chain. In this construction the transverse pin 2 is made in the form of a bolt having a nut 21 and having at each end washers 22 which abut upon the outer surfaces of the links 3. The flight 4 is formed from a blank of sheet metal as shown in Figure 10 consisting of a rectangular plate having thereon an integral arm 41 so shaped as to correspond to the form of the link 3 and having openings 42 adapted to be engaged by the bolts 2 and 2'. Thus the flight, as shown in position upon the chain in Figures 1 and 2, has the arm 41 bent at right angles to it, thus forming a very simple connection to the chain. Upon the marginal edges of the flight 4 are the projections 43, 44 which are bent up at right angles to the plate, as shown in Figures 1 and 2, for the purpose above recited. The pin which passes through the tail end of the portion 41 may have a rivet head at one end and a cotter pin at the other end as shown at 2' in Figures 1 and 2.

In the modification shown in Figures 3 and 4, the flights are provided with short arms 41A bent at right angles to the flight itself and secured to the outer face of the link 3 as by the screws 23.

In the modification shown in Figures 5 and 6 there is employed, in place of the pair of inner links 1 as above described, the special casting 1A having laterally projecting arms 1B to which flat flights are secured as by the bolts 24. The pairs of adjoining links may in this case be connected as by the rivets 2''.

In the modification shown in Figures 7 and 8, the outer links 3 have their trailing ends bent up at right angles as shown at 31 and the flat flights are secured in position by means of the bolts 24. In this construction the bent up portions 31 may be made wider than the body of the link so as to provide for two bolts on each flight as shown in Figure 9 of the drawing, in which the left hand half carries a more or less semi-circular flight adapted to travel within a circular casing C while the right hand half shows a rectangular flight for traveling in a rectangular casing D.

In Figure 11 of the drawing is shown a construction in which the flights are arranged at an angle to the axis of the chain, the said flights being attached to a special link 1A of the kind shown in Figures 5 and 6 except that in this case the arms 1B are disposed at the proper angle to receive the flat flights 4. It will be noted that in this construction the flights are arranged so as to incline at alternately opposite directions, by which means the chain as a whole is balanced and prevented from being forced to one side or the other of the casing D by the pressure of material. This is necessary on long runs, but on short vertical runs the flights may all lean in one direction.

The construction of flights shown in Figure 11 is found to be particularly advantageous in cases where the vertical run of the conveyer passes upwards through the pile of material in a bin or storage space. In these cases the sides of the conduit are left open and merely guiding members retained through the bin, by which means the material is dumped automatically as it reaches the top of the pile so that the breakage due to material dropping for some distance on to the pile is eliminated, the material merely sliding off the inclined surface of the flight.

In cases where a discharge opening is located upon one side of a vertical run of the conduit, obviously the flights would all be inclined in one direction.

The arrangement just recited eliminates the mechanical tilting of the flights at the point of discharge on a vertical run which is common in many types of conveyers.

Furthermore, the adoption of my inclined flights in a filled conduit avoids the use of an adjustable gate to prevent choking of the conduit at the feeding point which is generally located upon the horizontal run of the conveyer.

The angle of inclination of the flights is determined by the angle of repose of the particular material to be conveyed.

Another method of connecting the flight to the chain, in cases where only a hollow frame is required, is shown in Figures 12 and 13. In this arrangement the flight, together with its connecting elements, is formed from a single blank having a central space 46 and having at the side nearest to the chain a wide portion which is split upon the line $x$ so as to form two arms 61, 62. These arms, shown flat in broken lines in Figure 13, are bent into the forms shown in side view in Figure 12, the said arms terminating in loops 63, 64 adapted to engage the tranverse pins 2 of the chain which in this case take the form of bolts having nuts 21 and washers 22, so that the inner and outer arms are connected to adjoining link pins, thereby forming a very simple and at the same time resilient connection between the chain and the flight since the inner and outer links 1, 3 may in this case be of standard commercial construction, as shown in Figures 1 and 2 of the drawing. The flight, as shown, would be adapted for mounting continuously along the chain, but if found desirable to use alternate spacing of the flights it will be necessary, in order to preserve their proper alignment, to insert bushings 65 between the arms 62 and the outer faces of the adjacent links.

In all of the modifications herein shown and described the flights are arranged in pairs, one on each side of the chain, but it will be understood that in run-around conveyers operating in a horizontal plane, a series of single flights may be employed since in this form of conveyer the chain is positioned in the upper portion of the casing and above the material being conveyed.

It may be noted that according to the present invention the flights and their connection to the propelling chain are so designed as to maintain their positions rigidly when conveying the proper amount of material at the rated speed, but that, owing to their resilient construction, they will yield under excess loads or in the presence of minor obstructions and then return to their original shape without damage.

While I have herein described and shown a number of preferred embodiments of my invention, it will be readily understood by those skilled in the art to which the same pertains that various changes in detail may be made to meet any particular or peculiar requirements without departing from the spirit of the invention as defined in the appended claims.

Having thus described my said invention, what I claim and desire to secure by Letters Patent of the United States is:

1. In a flight conveyer for a conduit arranged to follow a desired circuit; a chain comprising alternate pairs of inner and outer links connected by transverse pivot pins; a series of flights formed from plate material cut to conform substantially to the interior surface of said conduit and extending sidewise from said links in opposite directions from opposite sides of said chain; and arms extending at an angle to said flights and having openings fitting over the ends of said pivot pin for securing said flights upon said chain, said flights having bent-up peripheral projections extending outwardly from their marginal edges, said projections being adapted to slidably contact the interior surface of the conduit.

2. In a flight conveyer for a conduit arranged to follow a desired circuit, a chain comprising alternate pairs of inner and outer links connected by transverse pivot pins; a series of flights formed from plate material cut to conform substantially to the interior surface of said conduit and extending sidewise from said links from one side of said chain and arms extending at an angle to said flights and having openings fitting over the ends of said pivot pins for securing said flights upon said chain, said flights having bent-up peripheral projections extending outwardly from their marginal edges, said projections being adapted to slidably contact the interior surface of the conduit.

HENRY W. HAPMAN.